(12) United States Patent
Jiang

(10) Patent No.: US 11,510,253 B2
(45) Date of Patent: Nov. 22, 2022

(54) RANDOM ACCESS CONTROL METHOD AND RANDOM ACCESS CONTROL APPARATUS

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/260,535

(22) PCT Filed: Jul. 16, 2018

(86) PCT No.: PCT/CN2018/095802
§ 371 (c)(1),
(2) Date: Jan. 14, 2021

(87) PCT Pub. No.: WO2020/014823
PCT Pub. Date: Jan. 23, 2020

(65) Prior Publication Data
US 2021/0274569 A1   Sep. 2, 2021

(51) Int. Cl.
*H04W 74/08* (2009.01)
*H04W 76/19* (2018.01)
(Continued)

(52) U.S. Cl.
CPC ...... *H04W 74/0841* (2013.01); *H04B 7/0695* (2013.01); *H04W 74/008* (2013.01);
(Continued)

(58) Field of Classification Search
CPC .. H04B 7/0695; H04W 74/008; H04W 74/02; H04W 74/0833; H04W 74/0841; H04W 76/19; H04W 80/02
See application file for complete search history.

(56) References Cited

U.S. PATENT DOCUMENTS

2012/0218973 A1* 8/2012 Du .................. H04W 36/14
370/331
2018/0191422 A1   7/2018 Xia et al.
(Continued)

FOREIGN PATENT DOCUMENTS

| CN | 107005858 A | 8/2017 |
|---|---|---|
| CN | 107567038 A | 1/2018 |
| CN | 107612602 A | 1/2018 |

OTHER PUBLICATIONS

International Search Report in Application No. PCT/CN2018/095802, dated Mar. 26, 2019.
(Continued)

*Primary Examiner* — Kashif Siddiqui
(74) *Attorney, Agent, or Firm* — Syncoda LLC; Feng Ma

(57) ABSTRACT

A random access control method can be applied to electronic devices and include: determining, when a medium access control layer receives a beam failure instance indication sent by a physical layer, whether a count value of a beam failure indication counter is greater than or equal to a preset value; detecting, when the count value of the beam failure indication counter is greater than or equal to the preset value, whether the electronic device is currently performing a random access; triggering, when the electronic device is not currently performing the random access, a new random access. According to the embodiments of the present disclosure, the user device can be prevented from occupying resources for a contention free random access (CFRA) for a long time.

17 Claims, 8 Drawing Sheets

Determine, when a medium access control layer receives a beam failure instance indication sent by a physical layer, whether a count value of a beam failure indication counter is greater than or equal to a preset value. — S1

Detect, when the count value of the beam failure indication counter is greater than or equal to the preset value, whether the electronic device is currently performing a random access. — S2

When the electronic device is not currently performing a random access, a new random access is triggered. — S3

(51) Int. Cl.
  *H04B 7/06* (2006.01)
  *H04W 74/00* (2009.01)
  *H04W 74/02* (2009.01)
  *H04W 80/02* (2009.01)

(52) U.S. Cl.
  CPC ........... *H04W 74/02* (2013.01); *H04W 76/19* (2018.02); *H04W 80/02* (2013.01)

(56) References Cited

U.S. PATENT DOCUMENTS

| | | | |
|---|---|---|---|
| 2019/0274169 A1* | 9/2019 | Tsai | H04W 56/003 |
| 2020/0367293 A1* | 11/2020 | Zhang | H04W 74/0833 |
| 2020/0374960 A1* | 11/2020 | Deenoo | H04W 72/1284 |
| 2021/0028849 A1* | 1/2021 | Chin | H04W 72/1268 |
| 2021/0153245 A1* | 5/2021 | Tooher | H04W 72/0453 |
| 2021/0218457 A1* | 7/2021 | Xu | H04W 72/085 |

OTHER PUBLICATIONS

Catt "3GPP TSG RAN WG1 Meeting #93 R1-1806281", Remaining Issues on Beam Failure Recovery, May 12, 2018, p. 1, Line 20 to last line.

CN 1st Office Action in Application No. 201880001494.1, dated Nov. 5, 2021.

\* cited by examiner

RANDOM ACCESS CONTROL METHOD AND RANDOM ACCESS CONTROL APPARATUS

CROSS-REFERENCE TO RELATED APPLICATIONS

This application is a U.S. national stage of International Application No. PCT/CN2018/095802 filed on Jul. 16, 2018, the disclosure of which is hereby incorporated by reference in its entirety.

TECHNICAL FIELD

The present disclosure relates to the field of communication technology, and in particular, to a random access control method, a random access control apparatus, an electronic device, and a computer-readable storage medium.

BACKGROUND

In NR (New Radio), a user device can monitor beam signals. When the monitored beam signal does not meet requirements, a physical layer will send a beam failure instance indication to a medium access control layer, which is counted as one beam failure. When a count value of beam failure is greater than or equal to a preset value, if the medium access control layer receives a beam failure instance indication sent by the physical layer, the user device will trigger a random access and then initiate the random access. The initiated random access can be a contention free random access (CFRA), or a contention based random access (CBRA).

A beam failure recovery timer is provided according to the related technology. When the user device triggers a random access, the timer is reset and starts timing. When the timer does not expire, the user device preferentially selects resources for CFRA to initiate a CFRA when the user device initiates the random access. When the timer expires, the user device preferentially selects resources for CFRA to initiate a CBRA when the user device initiates the random access. In this way, it can be ensured that the user device will not occupy same resources for a long time to initiate random accesses with a same type.

However, because the physical layer does not know whether the count value of beam failure is greater than or equal to the preset value, and when the physical layer sends a beam failure instance indication to the medium access control layer every time when it monitors that the beam signal does not meet requirements. In this case, when the count value of beam failure is greater than or equal to the preset value, the user device initiates a random access when receiving the beam failure instance indication sent by the physical layer for the first time. However, the user device still initiates a random access when receiving the following beam failure instance indication sent by the physical layer.

In this case, it will cause the timer, which is performing timing due to the random access initiated by the user device for the first time, to be reset and to restart a timing. So that the timer will not expire for a long period. In this way, the user device selects resources for CFRA during a long period to initiate the CFRA, which causes excessive occupation of the resources for CFRA.

SUMMARY

In view of this, the embodiments of the present invention propose a random access control method, a random access control apparatus, an electronic device, and a computer-readable storage medium.

According to the first aspect of the embodiments of the present invention, a random access control method is provided, which can be applied to an electronic device, and the method includes: determining, when a medium access control layer receives a beam failure instance indication sent by a physical layer, whether a count value of a beam failure indication counter is greater than or equal to a preset value; detecting, when the count value of the beam failure indication counter is greater than or equal to the preset value, whether the electronic device is currently performing a random access; triggering, when the electronic device is not currently performing the random access, a new random access.

Optionally, the triggering, when the electronic device is not currently performing the random access, the new random access comprises: triggering, when the electronic device is not currently performing the random access for a beam failure recovery, the new random access.

Optionally, the method further includes: controlling the medium access control layer to ignore a following beam failure instance indication sent by the physical layer.

Optionally, the method further includes: controlling, after success of the new random access, the medium access control layer to stop ignoring the beam failure instance indication sent by the physical layer.

Optionally, the method further includes: controlling the physical layer to stop sending the beam failure instance indication to the medium access control layer.

Optionally, the method further includes: controlling, after success of the new random access, the physical layer to continue to send the beam failure instance indication to the medium access control layer.

Optionally, the method further includes: sending, before the controlling the physical layer to stop sending the beam failure instance indication to the medium access control layer, indication information to the physical layer through the medium access control layer, wherein the indication information is configured to indicate the physical layer that the electronic device is currently performing the random access, or indicate the physical layer to stop sending the beam failure instance indication to the medium access control layer.

Optionally, the method further includes: setting the count value of the beam failure indication counter to be zero.

Optionally, the method further includes: setting, after success of the new random access, the count value of the beam failure indication counter to be zero again.

Optionally, the triggering the new random access includes: determining, according to configuration information, whether to trigger the new random access when the medium access control layer receives the beam failure instance indication sent by the physical layer, the count value of the beam failure indication counter is greater than or equal to the preset value and the electronic device is currently performing the random access; and triggering, when it is determined to trigger the new random access, the new random access.

Optionally, the configuration information is provided by a base station in real time, or pre-stored in the electronic device.

According to a second aspect of the embodiments of the present invention, a random access control apparatus is provided, which is applied to an electronic device, and the apparatus includes: a count value determination module, configured to determine, when a medium access control layer receives a beam failure instance indication sent by a physical layer, whether a count value of a beam failure indication counter is greater than or equal to a preset value; a random access detection module, configured to detect, when the count value of the beam failure indication counter is greater than or equal to the preset value, whether the electronic device is currently performing a random access; a random access control module, configured to trigger, when the electronic device is not currently performing the random access, a new random access.

Optionally, the random access control module is configured to trigger, when the electronic device is not currently performing the random access for a beam failure recovery, the new random access.

Optionally, the device further includes: an ignoring control module, configured to control the medium access control layer to ignore the following beam failure instance indication sent by the physical layer Optionally, the ignoring control module is further configured to control, after success of the new random access, the medium access control layer to stop ignoring the beam failure instance indication sent by the physical layer.

Optionally, the device further includes: an indication control module, configured to control the physical layer to stop sending the beam failure instance indication to the medium access control layer.

Optionally, the instruction control module is further configured to control, after success of the new random access, the physical layer to continue to send the beam failure instance indication to the medium access control layer.

Optionally, the device further includes: a physical layer indication module, configured to send, before the controlling the physical layer to stop sending the beam failure instance indication to the medium access control layer, indication information to the physical layer through the medium access control layer, and the indication information is configured to indicate the physical layer that the electronic device is currently performing the random access, or indicate the physical layer to stop sending the beam failure instance indication to the medium access control layer.

Optionally, the device further includes: a counter control module, configured to set the count value of the beam failure indication counter to be zero.

Optionally, the counter control module is further configured to set, after success of the new random access, the count value of the beam failure indication counter to be zero again.

Optionally, the random access control module includes: a determination sub-module, configured to determine, according to configuration information, whether to trigger the new random access when the medium access control layer receives the beam failure instance indication sent by the physical layer, the count value of the beam failure indication counter is greater than or equal to the preset value and the electronic device is currently performing the random access; and an initiating sub-module, configured to trigger, when it is determined to trigger the new random access, the new random access.

Optionally, the configuration information is provided by a base station in real time, or pre-stored in the electronic device.

According to a third aspect of the embodiments of the present invention, an electronic device is provided, including:
a processor;
a memory for storing processor-executable instructions;
wherein, the processor is configured to execute the method of any of the above embodiments.

According to a fourth aspect of the embodiments of the present invention, a computer-readable storage medium is provided, having a computer program stored therein, wherein the computer program, when executed by a processor, implements steps of the method of any of the above embodiments.

According to some embodiments of the disclosure, when the medium access control layer receives the beam failure instance indication sent by the physical layer, and the count value of the beam failure indication counter is greater than or equal to the preset value, the user device can detect whether it is currently performing a random access.

If the random access is not currently being performed, a new random access can be triggered. That is, when a random access is currently being performed, the currently random access can be kept being performed without triggering a new random access. This ensures that the new random access can be triggered only when the medium access control layer receives the beam failure instance indication sent by the physical layer and the count value of the beam failure indication counter is greater than or equal to the preset value and the user device is currently not performing the random access, thereby avoiding a random access being triggered again during the process of performing the current random access. Therefore, this prevents the beam failure recovery timer, which is performing timing due to the current random access, from being reset and restarting a timing before expiring. So that the beam failure recovery timer can expire in a short time. Therefore, the user device can select resources for CFRA to initiate the CBRA after a period of time after selecting resources for CFRA to initiate the CFRA, thereby avoiding long-term occupation of resources for CFRA.

BRIEF DESCRIPTION OF THE DRAWINGS

In order to explain technical solutions in the embodiments of the present disclosure more clearly, the following will briefly describe the drawings needed in the description of the embodiments. Obviously, the drawings in the following description are only illustrating some embodiments of the present disclosure. For those of ordinary skill in the art, other drawings can be obtained based on these drawings without creative work.

DETAILED DESCRIPTION

The technical solutions in the embodiments of the present disclosure will be described clearly and completely in conjunction with the accompanying drawings in the embodiments of the present disclosure. Obviously, the described embodiments are only a part of the embodiments of the present disclosure, rather than all the embodiments. Based on the embodiments in the present disclosure, all other embodiments obtained by those of ordinary skilled in the art without creative work shall fall within the protection scope of the present disclosure.

Figure 1:
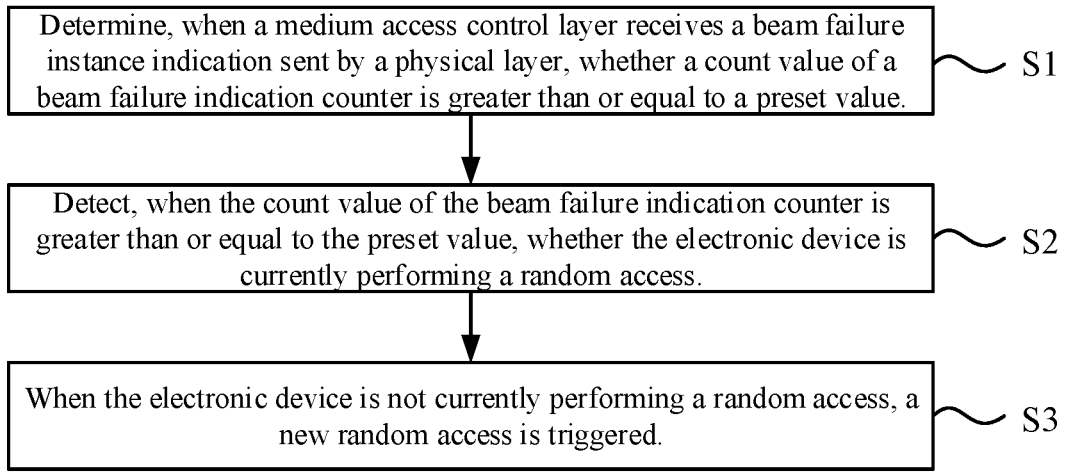
FIG. 1 is a schematic flowchart showing a random access control method according to embodiments of the present disclosure.

FIG. 1 is a schematic flowchart showing a random access control method according to embodiments of the present disclosure. The random access control method shown in this embodiment can be applied to an electronic device. The electronic device can be a user device used for communication, which can be, for example, a mobile phone, a tablet computer, a smart wearable device, and the like; and the user device can communicate through NR.

As shown in FIG. 1, the random access control method includes:

At step S1, when a medium access control layer receives a beam failure instance indication sent by a physical layer, it is determined that whether a count value of a beam failure indication counter (BFI_COUNTER) is greater than or equal to a preset value.

At step S2, when the count value of the beam failure indication counter is greater than or equal to the preset value, it is detected whether the electronic device is currently performing a random access.

At step S3, when the electronic device is not currently performing a random access, a new random access is triggered.

In an embodiment, when the medium access control layer receives the beam failure instance indication sent by the physical layer, and the count value of the beam failure indication counter is greater than or equal to the preset value, the user device can detect whether it is currently performing a random access.

If the random access is not currently being performed, a new random access can be triggered. That is, when a random access is currently being performed, the currently random access can be kept being performed without triggering a new random access. This ensures that the new random access can be triggered only when the medium access control layer receives the beam failure instance indication sent by the physical layer and the count value of the beam failure indication counter is greater than or equal to the preset value and the user device is currently not performing the random access, thereby avoiding a random access being triggered again during the process of performing the current random access. Therefore, this prevents the beam failure recovery timer, which is performing timing due to the current random access, from being reset and restarting a timing before expiring. So that the beam failure recovery timer can expire in a short time. Therefore, the user device can select resources for CFRA to initiate the CBRA after a period of time after selecting resources for CFRA to initiate the CFRA, thereby avoiding long-term occupation of resources for CFRA.

It should be noted that after triggering a new random access, the user device also needs to detect whether a random access is currently performed. When a random access is currently performed, according to configuration information, the current random access can be continued or a new random access can be initiated. Triggering and initiating are different actions. Triggering a random access indicates that it is determined whether to perform the random access, and regarding whether to perform the random access or not, other factors need to be further considered, while initiating a random access indicates that the random access is performed.

Figure 2:
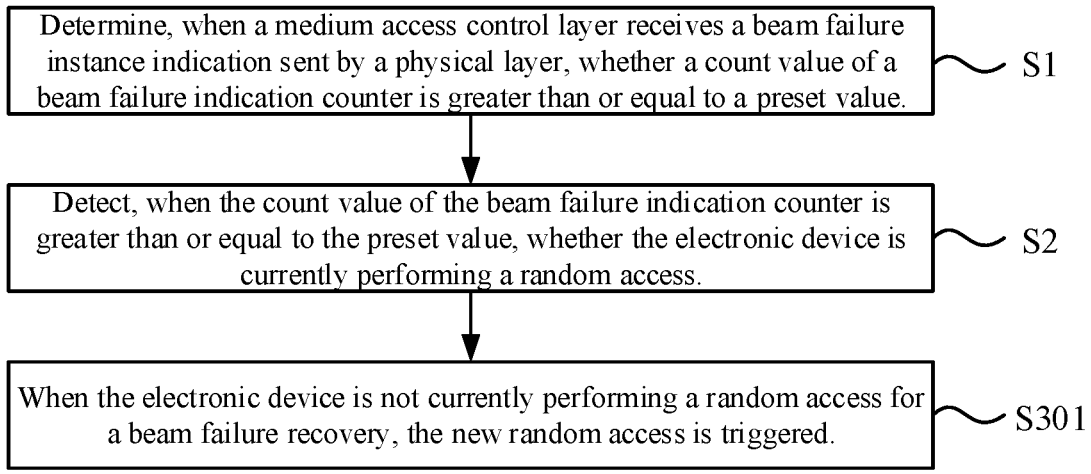
FIG. 2 is a schematic flowchart showing another random access control method according to embodiments of the present disclosure.

FIG. 2 is a schematic flowchart showing another random access control method according to embodiments of the present disclosure. As shown in FIG. 2, based on the embodiments shown in FIG. 1, the step of triggering, when the electronic device is not currently performing the random access, the new random access includes:

At step S301, when the electronic device is not currently performing a random access for a beam failure recovery, the new random access is triggered.

In one embodiment, whether the detected electronic device is currently performing a random access may mean that it is detected whether the electronic device is currently performing a random access for the beam failure recovery. If it is not currently performing the random access for the beam failure recovery, or, even if a random access is being performed currently, but the random access being performed currently is not for the beam failure recovery, then because it is required to perform a beam failure recovery when the medium access control layer receives the beam failure instance indication sent by the physical layer and the count value of the beam failure indication counter is greater than or equal to the preset value, and the beam failure recovery has a higher priority, so a new random access can be triggered to complete the beam failure recovery as soon as possible.

Figure 3:
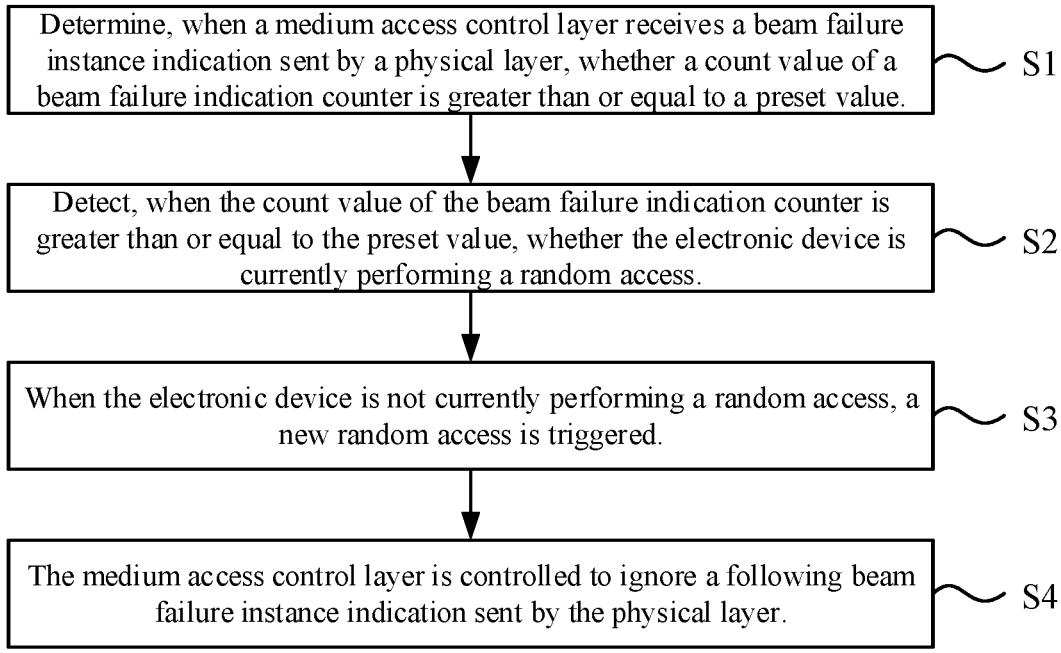
FIG. 3 is a schematic flowchart showing yet another random access control method according to embodiments of the present disclosure.

FIG. 3 is a schematic flowchart showing yet another random access control method according to embodiments of the present disclosure. As shown in FIG. 3, based on the embodiment shown in FIG. 1, the method further includes:

At step S4, the medium access control layer is controlled to ignore the following beam failure instance indication sent by the physical layer.

In an embodiment, after triggering a new random access, the medium access control layer can be controlled to ignore the following beam failure instance indication sent by the physical layer. In other words, the physical layer can still send beam failure instance indication to the medium access control layer, but the medium access control layer does not determine whether the count value of the beam failure indication counter is greater than or equal to the preset value. Therefore, even if the count value of the beam failure indication counter is greater than or equal to the preset value, it will not trigger the random access, so as to avoid triggering the random access again in the process of triggering the new random access.

Figure 4:
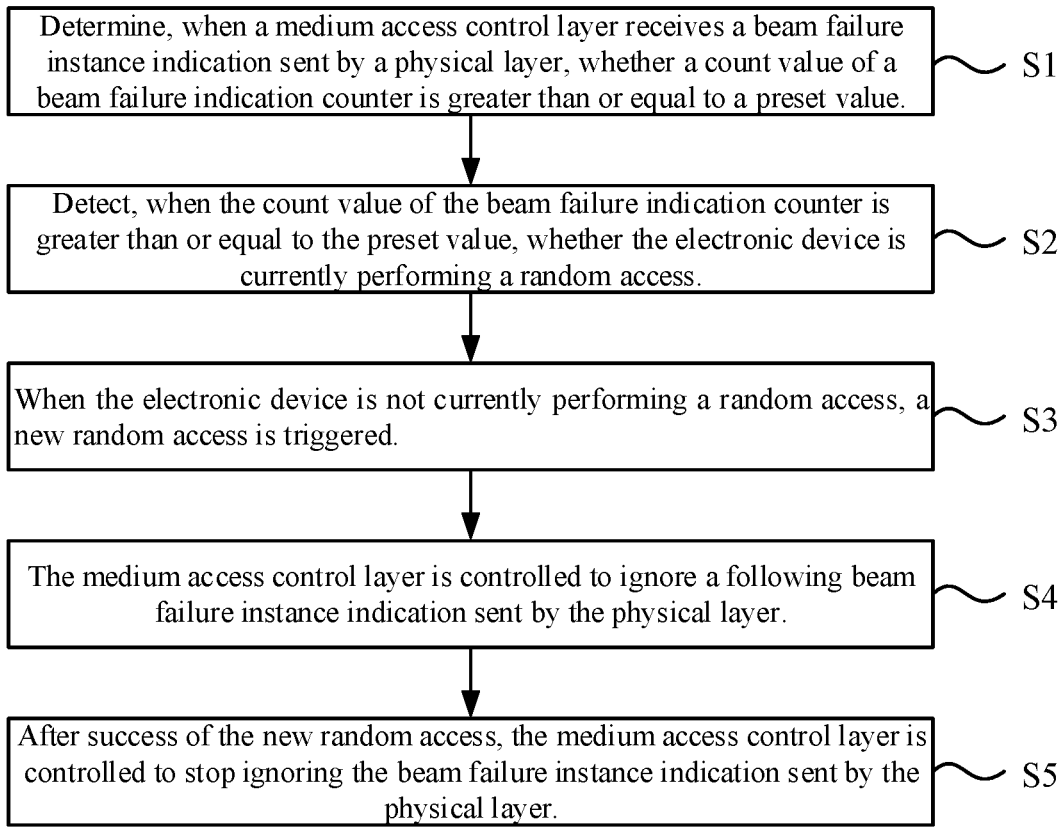
FIG. 4 is a schematic flowchart showing yet another random access control method according to embodiments of the present disclosure.

FIG. 4 is a schematic flowchart showing yet another random access control method according to embodiments of the present disclosure. As shown in FIG. 4, based on the embodiments shown in FIG. 3, the method further includes:

At step S5, after success of the new random access, the medium access control layer is controlled to stop ignoring following the beam failure instance indication sent by the physical layer.

In an embodiment, if the new random access initiated is performed successfully, it means that the user device has achieved the beam failure recovery, so it can continue to monitor the beam and re-count the number of beam failures, thereby controlling the medium access control layer to stop ignoring the following beam failure instance indication sent by the physical layer. That is, when the medium access control layer receives the following beam failure instance indication sent by the physical layer, the received beam failure instance indication can be counted by the beam failure indication counter.

It should be noted that, in this embodiment and subsequent embodiments, the successful performing of the random access may be determined by the user device receiving information from a physical control downlink channel.

Figure 5:
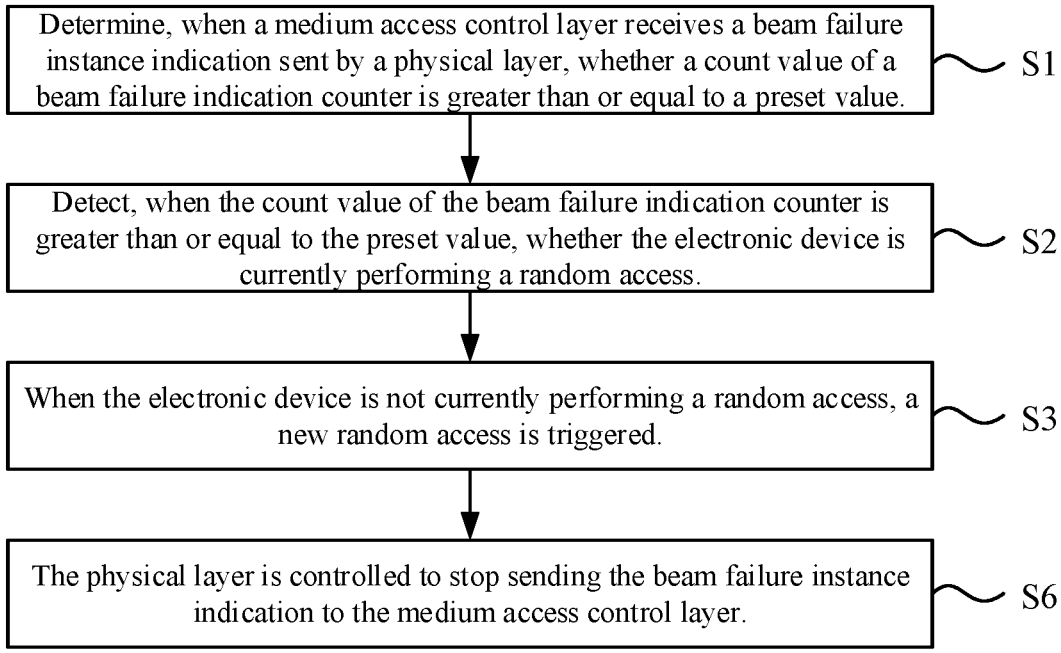
FIG. 5 is a schematic flowchart showing yet another random access control method according to embodiments of the present disclosure.

FIG. 5 is a schematic flowchart showing yet another random access control method according to embodiments of the present disclosure. As shown in FIG. 5, based on the embodiments shown in FIG. 1, the method further includes:

At step S6, the physical layer is controlled to stop sending the beam failure instance indication to the medium access control layer.

In an embodiment, after triggering a new random access, the physical layer can be controlled to stop sending the beam failure instance indication to the medium access control layer. Based on this, even if the count value of the beam failure indication counter is greater than or equal to the preset, it will not trigger the random access since the medium access control layer will not receive the beam failure instance indication sent by the physical layer, thereby avoiding the random access being triggered again in the process of triggering new random access.

Figure 6:
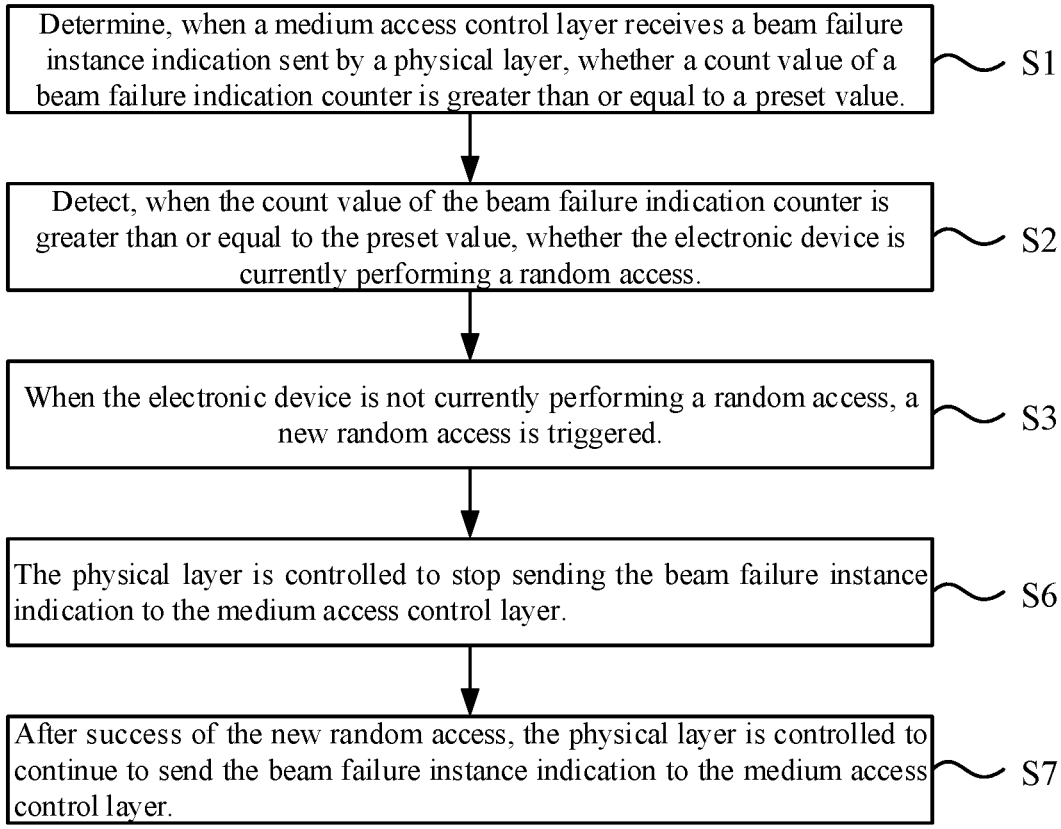
FIG. 6 is a schematic flowchart showing yet another random access control method according to embodiments of the present disclosure.

FIG. 6 is a schematic flowchart showing yet another random access control method according to embodiments of the present disclosure. As shown in FIG. 6, based on the embodiments shown in FIG. 5, the method further includes:

At step S7, after success of the new random access, the physical layer is controlled to continue to send the beam failure instance indication to the medium access control layer.

In an embodiment, if success of the new random access, it means that the user device has achieved the beam failure recovery. Therefore, it can continue to monitor the beam and re-count the number of beam failures, thereby controlling the physical layer to continue to send the beam failure instance indication to the medium access control layer, so that when the medium access control layer receives the following beam failure instance indication sent by the physical layer, the received beam failure instance indication can be counted through the beam failure indication counter.

Figure 7:
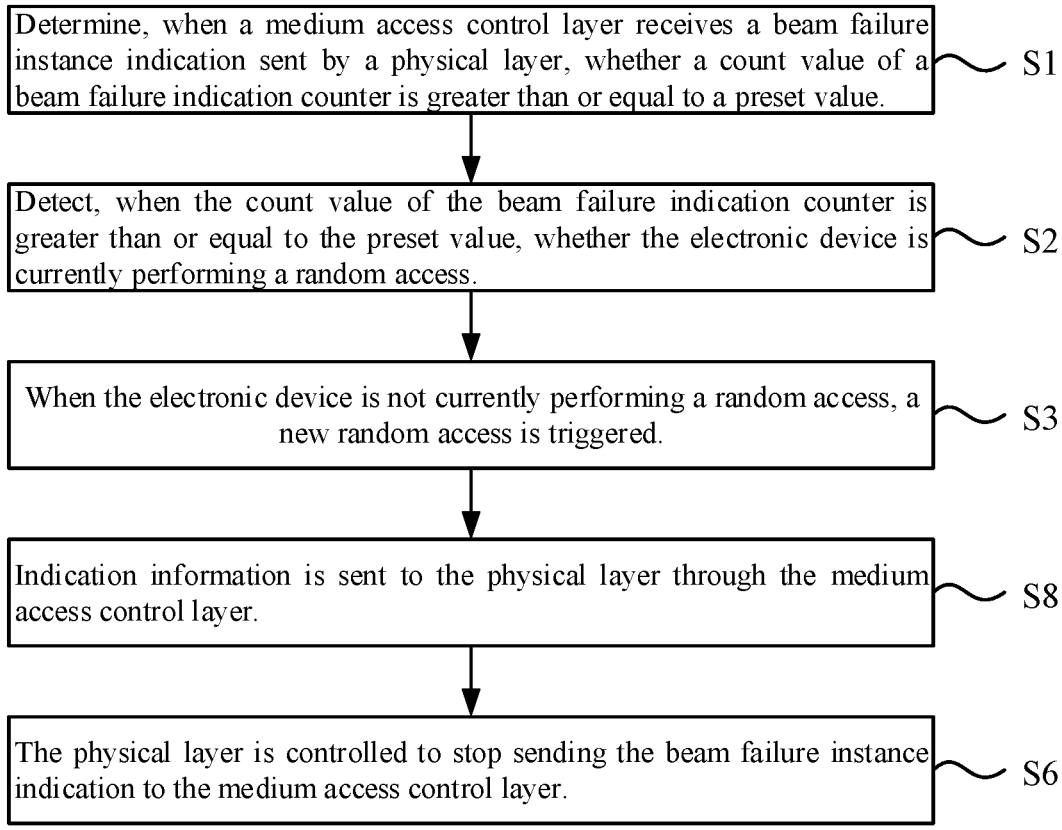
FIG. 7 is a schematic flowchart showing yet another random access control method according to embodiments of the present disclosure.

FIG. 7 is a schematic flowchart showing yet another random access control method according to embodiments of the present disclosure. As shown in FIG. 7, based on the embodiments shown in FIG. 5, the method further includes:

At step S8, before the controlling the physical layer to stop sending the beam failure instance indication to the medium access control layer, indication information is sent to the physical layer through the medium access control layer, and the indication information is configured to indicate the physical layer that the electronic device is currently performing the random access, or indicate the physical layer to stop sending the beam failure instance indication to the medium access control layer.

In an embodiment, indication information may be sent to the physical layer through the medium access control layer, so as to indicate, based on the indication information, the physical layer that the electronic device is currently performing the random access thereby causing the physical layer to stop sending the beam failure instance indication to the medium access control layer, or so as to directly indicate the physical layer to stop sending the beam failure instance indication to the medium access control layer.

Figure 8:
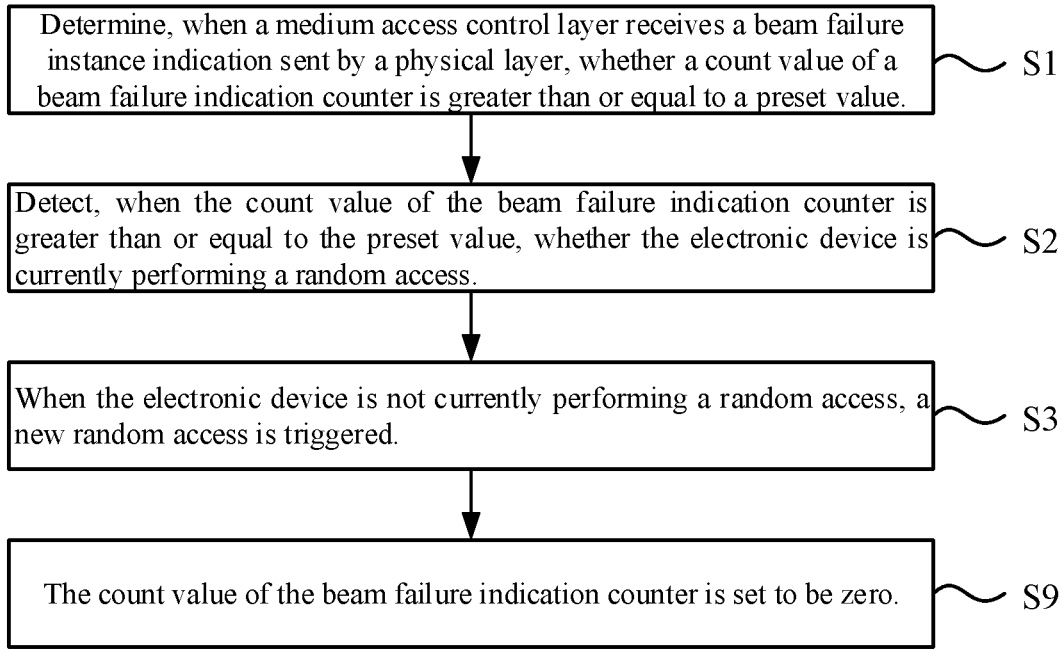
FIG. 8 is a schematic flowchart showing yet another random access control method according to embodiments of the present disclosure.

FIG. 8 is a schematic flowchart showing yet another random access control method according to embodiments of the present disclosure. As shown in FIG. 8, based on the embodiments shown in FIG. 1, the method further includes:

At step S9, the count value of the beam failure indication counter is set to be zero.

In an embodiment, after triggering the new random access, the count value of the beam failure indication counter may be set to be zero. That is, although the physical layer may send the beam failure instance indication to the medium access control layer, the random access will not be triggered, since the count value of the beam failure indication counter is set to be zero, that is, the count value of the beam failure indication counter is less than the preset value, which does not meet the condition for triggering the random access. In this way, the random access can be avoided being triggered again in the process of the triggering the new random access.

Figure 9:
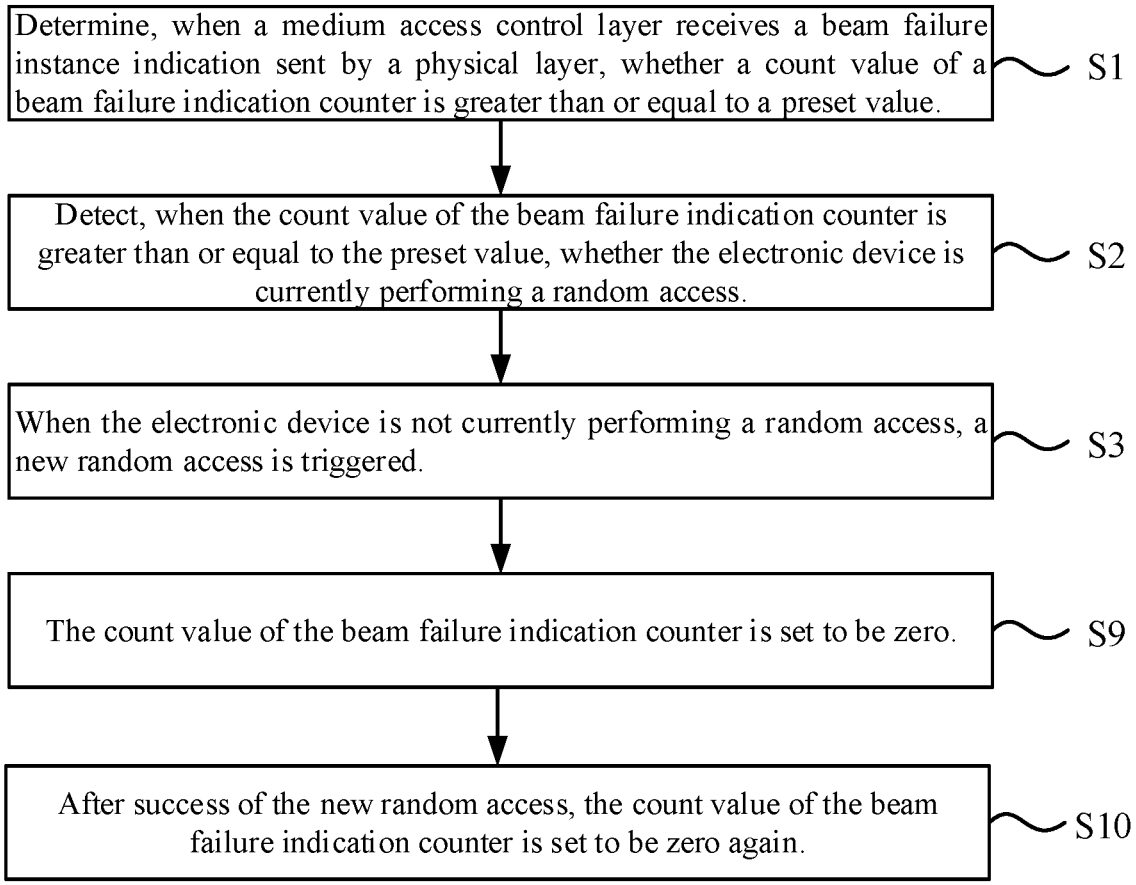
FIG. 9 is a schematic flowchart showing yet another random access control method according to embodiments of the present disclosure.

FIG. 9 is a schematic flowchart showing yet another random access control method according to embodiments of the present disclosure. As shown in FIG. 9, based on the embodiments shown in FIG. 8, the method further includes:

At step S10, after success of the new random access, the count value of the beam failure indication counter is set to be zero again.

In an embodiment, after success of the new random access, it means that the user device has achieved the beam failure recovery. Therefore, it can continue to monitor the beam and re-count the number of beam failures, so that the count value of the beam failure indication counter can be set to be zero again, and thus, when the medium access control layer receives the following beam failure instance indication sent by the physical layer, the following beam failure instance indication received can be counted by the beam failure indication counter.

Figure 10:
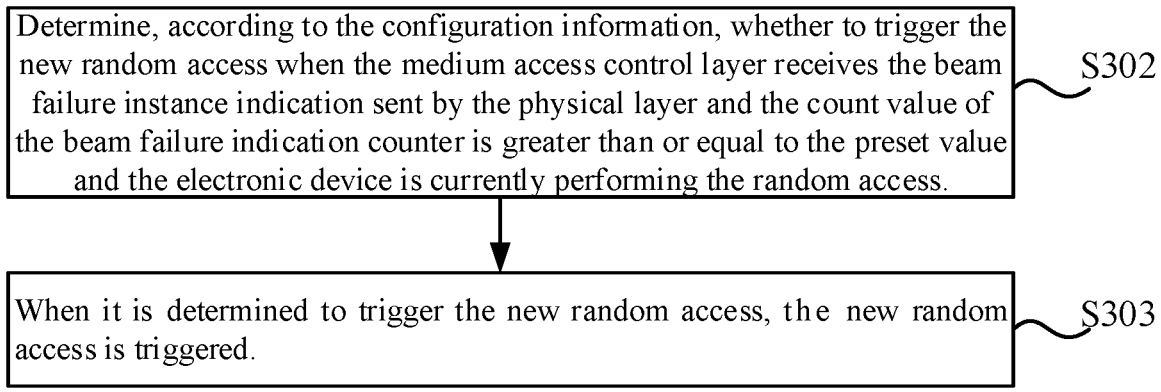
FIG. 10 is a schematic flowchart showing yet another random access control method according to embodiments of the present disclosure.

FIG. 10 is a schematic flowchart showing yet another random access control method according to embodiments of the present disclosure. As shown in FIG. 10, based on the embodiments shown in FIG. 1, the triggering the new random access includes:

At step S302, it is determined that, according to the configuration information, whether to trigger the new random access when the medium access control layer receives the beam failure instance indication sent by the physical layer and the count value of the beam failure indication counter is greater than or equal to the preset value and the electronic device is currently performing the random access.

At step S303, when it is determined to trigger the new random access, a new random access is triggered.

In an embodiment, when the medium access control layer receives the beam failure instance indication sent by the physical layer, and the count value of the beam failure indication counter is greater than or equal to the preset value, the random access needs to be triggered. However, if the random access is performed currently, the user device can determine whether to trigger the new random access in this case according to the configuration information. If it is determined to trigger the new random access, then a new random access is triggered, and if it is determined not to trigger the new random access, then the new random access is not triggered.

Accordingly, the configuration information can be used to control whether the user device triggers the new random access, which improves the controllability of the user device. The configuration information is provided by a base station in real time. For example, The configuration information can be sent by the base station through a physical downlink control channel, or pre-stored in the electronic device, e.g., it can be provided by the manufacturer of the electronic device when producing the electronic device.

Corresponding to the above embodiments of the random access control method, the present disclosure also provides embodiments of a random access control apparatus.

Figure 11:
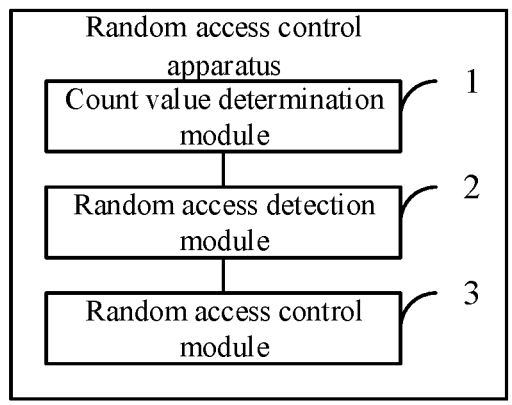
FIG. 11 is a schematic block diagram showing a random access control apparatus according to embodiments of the present disclosure.

FIG. 11 is a schematic block diagram showing a random access control apparatus according to embodiments of the present disclosure. The random access control apparatus shown in this embodiment may be applied to electronic devices, such as, a user device for communication, and the user device may be a mobile phone, a tablet computer, a smart wearable device, and the like. The user device can communicate through NR.

As shown in FIG. 11, the random access control apparatus includes:

a count value determination module 1, which is configured to determine, when a medium access control layer receives a beam failure instance indication sent by a physical layer, whether a count value of a beam failure indication counter is greater than or equal to a preset value;

a random access detection module 2, which is configured to detect, when the count value of the beam failure indication counter is greater than or equal to the preset value, whether the electronic device is currently performing a random access;

a random access control module 3, which is configured to trigger, when the electronic device is not currently performing a random access, a new random access.

Optionally, the random access control module is configured to trigger a new random access when the electronic device is not currently performing the random access for a beam failure recovery.

Figure 12:
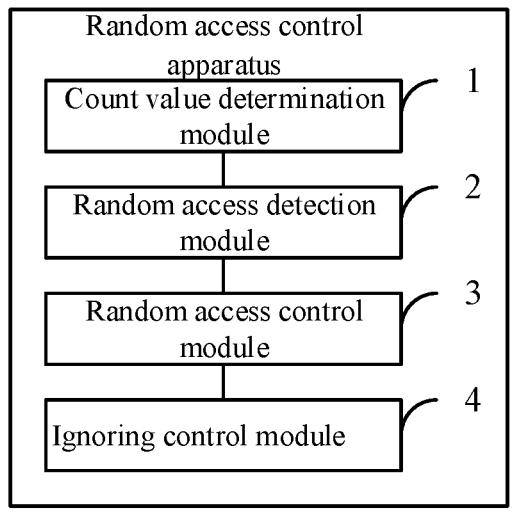
FIG. 12 is a schematic block diagram showing another random access control apparatus according to embodiments of the present disclosure.

FIG. 12 is a schematic block diagram showing another random access control apparatus according to embodiments of the present disclosure. As shown in FIG. 12, based on the embodiments shown in FIG. 11, the device further includes:

an ignoring control module 4, which is configured to control the medium access control layer to ignore a following beam failure instance indication sent by the physical layer.

Optionally, the ignoring control module 4 is further configured to control the medium access control layer to stop ignoring the following beam failure instance indication sent by the physical layer after success of the new random access.

Figure 13:
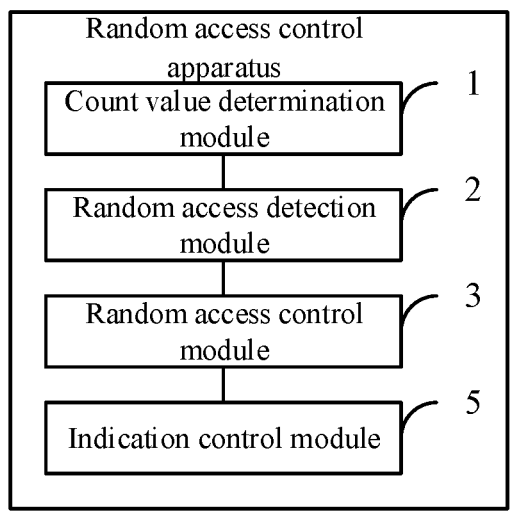
FIG. 13 is a schematic block diagram showing yet another random access control apparatus according to embodiments of the present disclosure.

FIG. 13 is a schematic block diagram showing yet another random access control apparatus according to embodiments of the present disclosure. As shown in FIG. 13, based on the embodiment shown in FIG. 11, the device further includes:

an indication control module, which is configured to control the physical layer to stop sending the beam failure instance indication to the medium access control layer.

Optionally, the indication control module 5 is further configured to control the physical layer to continue to send the beam failure instance indication to the medium access control layer after success of the new random access.

Figure 14:
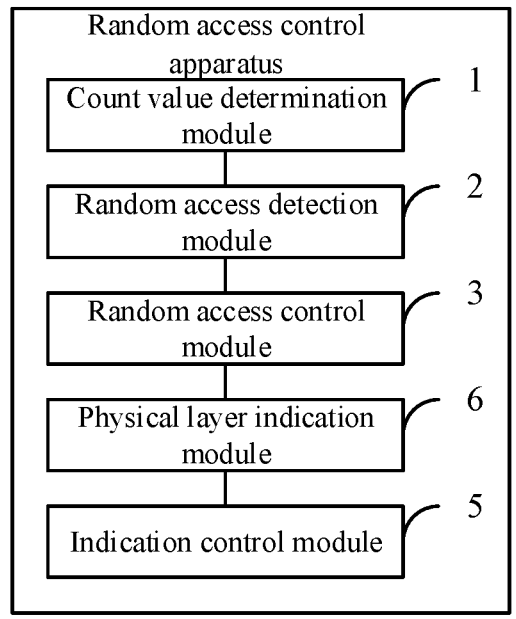
FIG. 14 is a schematic block diagram showing yet another random access control apparatus according to embodiments of the present disclosure.

FIG. 14 is a schematic block diagram showing yet another random access control apparatus according to embodiments of the present disclosure. As shown in FIG. 14, based on the embodiments shown in FIG. 13, the device further includes:

a physical layer indication module 6, which is configured to send, before the controlling the physical layer to stop sending the beam failure instance indication to the medium access control layer, indication information to the physical layer through the medium access control layer, the indication information being used to indicate the physical layer that the electronic device is currently performing the random access, or indicate the physical layer to stop sending the beam failure instance indication to the medium access control layer.

Figure 15:
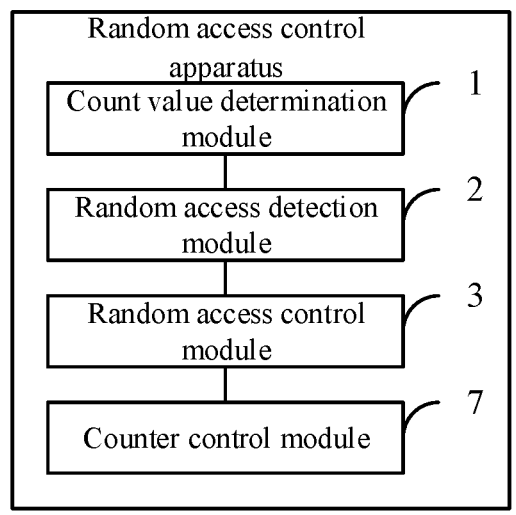
FIG. 15 is a schematic block diagram showing yet another random access control apparatus according to embodiments of the present disclosure.

FIG. 15 is a schematic block diagram showing yet another random access control apparatus according to embodiments of the present disclosure. As shown in FIG. 15, based on the embodiments shown in FIG. 11, the device further includes:

a counter control module, which is configured to set the count value of the beam failure indication counter to be zero.

Optionally, the counter control module is further configured to set the count value of the beam failure indication counter to be zero again after success of the new random access.

Figure 16:
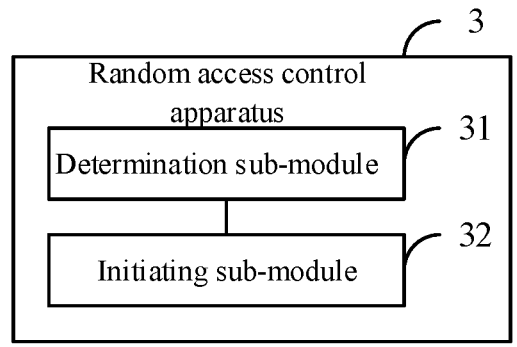
FIG. 16 is a schematic block diagram showing a random access control module according to embodiments of the present disclosure.

FIG. 16 is a schematic block diagram showing a random access control module 3 according to embodiments of the present disclosure. As shown in FIG. 16, based on the embodiments shown in FIG. 11, the random access control module 3 includes:

a determination sub-module 31, which is configured to determine, according to configuration information, whether to trigger the new random access when the medium access control layer receives the beam failure instance indication sent by the physical layer and the count value of the beam failure indication counter is greater than or equal to the preset value and the electronic device is currently performing the random access;

an initiating sub-module, which is configured to trigger, when it is determined to trigger the new random access, a new random access.

Optionally, the configuration information is provided by a base station in real time, or pre-stored in the electronic device.

Regarding the devices in the above embodiments, the specific manner in which each module performs operations has been described in detail in the embodiments of the corresponding method, which will not be described here.

As for the device embodiments, which are substantially corresponding to the method embodiments, thus the description thereof can refer to the corresponding description of the method embodiments. The device embodiments described above are merely illustrative. The units described as separate components may or may not be physically separated, and the components shown as units may or may not be physical units, that is, they may be located in one place, or they can be distributed to multiple network units; some or all of the modules may be selected according to actual needs to achieve the purpose of the embodiments, which can be understood by those ordinary skilled in the art and can be implemented without creative work.

An embodiment of the present disclosure also provides an electronic device, including: a processor; a memory for storing processor-executable instructions; and the processor is configured to execute the method of any of the above embodiments.

An embodiment of the present disclosure also provides a computer-readable storage medium having a computer program stored therein, and the computer program, when executed by a processor, implements the steps of method of any of the above embodiments.

Figure 17:
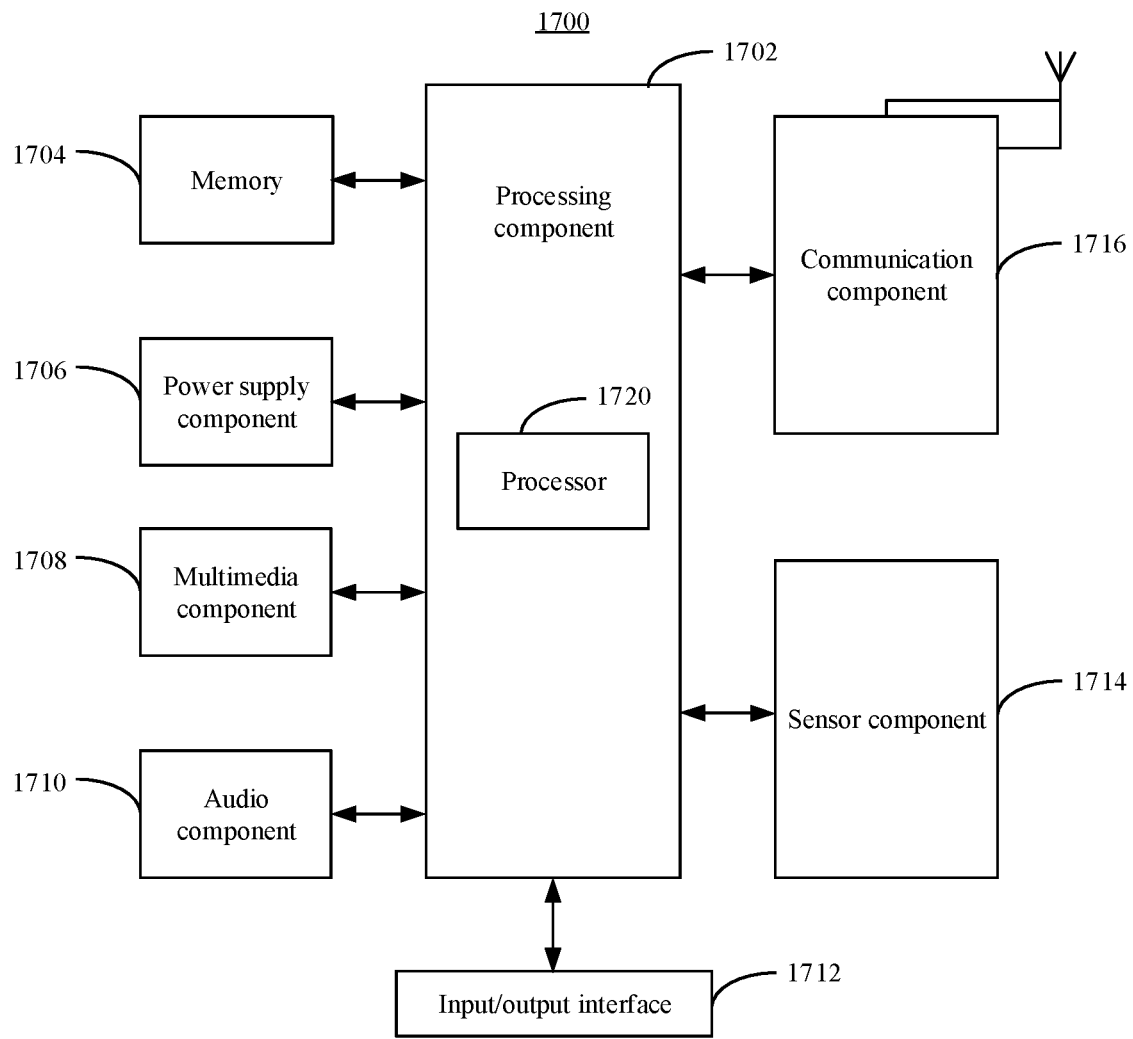
FIG. 17 is a schematic block diagram showing a random access control device according to embodiments of the present disclosure.

FIG. 17 is a schematic block diagram showing a random access control device 1700 according to embodiments of the present disclosure. For example, the apparatus 1700 may be a mobile phone, a computer, a digital broadcasting terminal, a messaging device, a game console, a tablet device, a medical device, a fitness device, a personal digital assistant, etc.

Referring to FIG. 17, the apparatus 1700 may include one or more of the following components: a processing component 1702, a memory 1704, a power supply component 1706, a multimedia component 1708, an audio component 1710, an input/output (I/O) interface 1712, a sensor component 1714, and the communication component 1716.

The processing component 1702 generally controls the overall operations of the apparatus 1700, such as operations associated with displaying, telephone calls, data communications, camera operations, and recording operations. The processing component 1702 may include one or more processors 1720 to execute instructions to complete all or part of the steps of the above methods. In addition, the processing component 1702 may include one or more modules to facilitate interaction between the processing component 1702 and other components. For example, the processing component 1702 may include a multimedia module to facilitate the interaction between the multimedia component 1708 and the processing component 1702.

The memory 1704 is configured to store various types of data to support operations in the apparatus 1700. Examples of such data may include instructions for any application or method operating on the apparatus 1700, contact data, phone book data, messages, pictures, videos, and the like. The memory 1704 can be implemented by any type of volatile or non-volatile storage device or a combination thereof, such as static random-access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply component 1706 provides power to various components of the apparatus 1700. The power supply component 1706 may include a power management system, one or more power supplies, and other components associated with the generation, management, and distribution of power for the apparatus 1700.

The multimedia component 1708 includes a screen that provides an output interface between the apparatus 1700 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touching, sliding, and gestures on the touch panel. The touch sensor may not only sense a boundary of the touching or sliding action, but also detect a duration and pressure related to the touching or sliding operation. In some embodiments, the multimedia component 1708 includes a front camera and/or a rear camera. When the apparatus 1700 is in an operation mode, such as a shooting mode or a video mode, the front camera and/or the rear camera can receive external multimedia data. Each front camera and rear camera can be a fixed optical lens system or have focal length and optical zoom capabilities.

The audio component 1710 is configured to output and/or input audio signals. For example, the audio component 1710 includes a microphone (MIC). When the apparatus 1700 is in an operating mode, such as a calling mode, a recording mode, and a voice recognition mode, the microphone is configured to receive external audio signals. The received audio signal may be further stored in the memory 1704 or transmitted via the communication component 1716. In some embodiments, the audio component 1710 further includes a speaker for outputting audio signals.

The I/O interface 1712 provides an interface between the processing component 1702 and a peripheral interface module. The peripheral interface module may be a keyboard, a click wheel, a button, and the like. These buttons may include but are not limited to: home button, volume button, start button, and lock button.

The sensor component 1714 includes one or more sensors for providing the apparatus 1700 with various aspects of status assessment. For example, the sensor component 1714 can detect the open/close status of the apparatus 1700 and the relative positioning of components. For example, the components can be a display and a keypad of the apparatus 1700. The sensor component 1714 can also detect position change of the apparatus 1700 or a component of the apparatus 1700, presence or absence of contact between the user and the apparatus 1700, an orientation or acceleration/deceleration of the apparatus 1700 and temperature change of the apparatus 1700. The sensor assembly 1714 may include a proximity sensor configured to detect presence of nearby objects without physical contacting. The sensor component 1714 may also include a light sensor, such as a CMOS or CCD image sensor, for imaging applications. In some embodiments, the sensor component 1714 may also include an acceleration sensor, a gyroscope sensor, a magnetic sensor, a pressure sensor or a temperature sensor.

The communication component 1716 is configured to facilitate wired or wireless communication between the apparatus 1700 and other devices. The apparatus 1700 can access a wireless network based on a communication standard, such as Wi-Fi, 2G, or 3G, or a combination thereof. In an exemplary embodiment, the communication component 1716 receives a broadcast signal from an external broadcast management system or broadcasts related information via a broadcast channel. In an exemplary embodiment, the communication component 1716 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the apparatus 1700 may be implemented by one or more application specific integrated circuits (ASIC), digital signal processors (DSP), digital signal processing equipment (DSPD), programmable logic devices (PLD), field programmable gate array (FPGA), controller, microcontroller, microprocessor, or other electronic components, and used to implement the method described in any of the above embodiments.

In an exemplary embodiment, there is also provided a non-transitory computer-readable storage medium including instructions, such as a memory 1704 including instructions, which can be executed by the processor 1720 of the apparatus 1700 to complete the above methods. For example, the non-transitory computer-readable storage medium may be ROM, random access memory (RAM), CD-ROM, magnetic tape, floppy disk, optical data storage device, and the like.

After considering the specification and practicing the disclosure disclosed herein, those skilled in the art will easily think of other embodiments of the present disclosure. The present disclosure is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are only regarded as exemplary, and the true scope and spirit of the present disclosure are pointed out by the appended claims.

It should be understood that the present disclosure is not limited to the precise structure that has been described above and shown in the drawings, and various modifications and changes can be made without departing from its scope. The scope of the present disclosure is only limited by the appended claims.

It should be noted that, in the present disclosure, relational terms such as first and second are only used to distinguish one entity or operation from another entity or operation, and do not necessarily require or imply that there is any such actual relationship or order between these entities or operations. The terms "include", "comprise" or any other variants thereof are intended to cover non-exclusive inclusion, so that a process, method, object or device including a series of elements not only includes those elements, but also includes other elements not explicitly listed, or includes elements inherent to such process, method, object, or device. If there are no more restrictions, the element defined by the sentence "includes a . . . " does not exclude the presence of other same elements in the process, method, object, or device that includes the element.

The methods and devices provided by the embodiments of the present invention are described in detail above. Specific examples are used herein to illustrate the principles and implementations of the present disclosure. The descriptions of the above embodiments are only used to help understand the methods and spirits of the present disclosure. Those of ordinary skilled in the art can change the specific implementation and the application scope according to the idea of the present disclosure. In summary, the content of the description should not be construed as a limitation of the present disclosure.

What is claimed is:

1. A random access control method, applied to an electronic device, comprising:
   determining, when a medium access control layer receives a beam failure instance indication sent by a physical layer, whether a count value of a beam failure indication counter is greater than or equal to a preset value;
   detecting, when the count value of the beam failure indication counter is greater than or equal to the preset value, whether the electronic device is currently performing a random access; and
   triggering, when the electronic device is not currently performing the random access, a new random access;
   wherein the method further comprises at least one of following steps:
   controlling the medium access control layer to ignore a following beam failure instance indication sent by the physical layer after the new random access is triggered; and
   controlling the physical layer to stop sending the beam failure instance indication to the medium access control layer after the new random access is triggered.

2. The method of claim 1, wherein the triggering, when the electronic device is not currently performing the random access, the new random access comprises:
   triggering, when the electronic device is not currently performing the random access for a beam failure recovery, the new random access.

3. The method of claim 1, further comprising:
   controlling, after success of the new random access, the medium access control layer to stop ignoring the following beam failure instance indication sent by the physical layer after the new random access is triggered.

4. The method of claim 1, further comprising:
   controlling, after success of the new random access, the physical layer to continue to send the beam failure instance indication to the medium access control layer.

5. The method of claim 1, further comprising:
   sending, before the controlling the physical layer to stop sending the beam failure instance indication to the medium access control layer, indication information to the physical layer through the medium access control layer, wherein the indication information is configured to indicate the physical layer that the electronic device is currently performing the random access, or indicate the physical layer to stop sending the beam failure instance indication to the medium access control layer.

6. The method of claim 1, further comprising:
   setting the count value of the beam failure indication counter to be zero after the new random access is triggered.

7. The method of claim 6, further comprising:
   setting, after success of the new random access, the count value of the beam failure indication counter to be zero.

8. The method of claim 1, wherein the triggering the new random access comprises:
   determining, according to configuration information, whether to trigger the new random access when the medium access control layer receives the beam failure instance indication sent by the physical layer, the count value of the beam failure indication counter is greater than or equal to the preset value and the electronic device is currently performing the random access; and
   triggering, when it is determined to trigger the new random access, the new random access.

9. The method of claim 8, wherein the configuration information is provided by a base station, or pre-stored in the electronic device.

10. An electronic device, comprising:
a processor;
memory storing processor-executable instructions for execution by the processor to perform steps of a method comprising:
determining, when a medium access control layer receives a beam failure instance indication sent by a physical layer, whether a count value of a beam failure indication counter is greater than or equal to a preset value;
detecting, when the count value of the beam failure indication counter is greater than or equal to the preset value, whether the electronic device is currently performing a random access; and
triggering, when the electronic device is not currently performing the random access, a new random access;
wherein the steps of the method further comprise at least one of:
controlling the medium access control layer to ignore a following beam failure instance indication sent by the physical layer after the new random access is triggered; and
controlling the physical layer to stop sending the beam failure instance indication to the medium access control layer after the new random access is triggered.

11. A non-transitory computer-readable storage medium, having a computer program stored therein for execution by a processor to implement steps of a method comprising:
determining, when a medium access control layer receives a beam failure instance indication sent by a physical layer, whether a count value of a beam failure indication counter is greater than or equal to a preset value;
detecting, when the count value of the beam failure indication counter is greater than or equal to the preset value, whether the electronic device is currently performing a random access; and
triggering, when the electronic device is not currently performing the random access, a new random access;
wherein the steps of the method further comprise at least one of:
controlling the medium access control layer to ignore a following beam failure instance indication sent by the physical layer after the new random access is triggered; and
controlling the physical layer to stop sending the beam failure instance indication to the medium access control layer after the new random access is triggered.

12. The electronic device of claim 10, wherein the triggering, when the electronic device is not currently performing the random access, the new random access comprises:
triggering, when the electronic device is not currently performing the random access for a beam failure recovery, the new random access.

13. The electronic device of claim 10, wherein the steps of the method further comprise:
controlling, after success of random access, the medium access control layer to stop ignoring the following beam failure instance indication sent by the physical layer after the new random access is triggered.

14. The electronic device of claim 10, wherein the steps of the method further comprise:
controlling, after success of the new random access, the physical layer to continue to send the beam failure instance indication to the medium access control layer.

15. The electronic device of claim 10, wherein the steps of the method further comprise:
sending, before the controlling the physical layer to stop sending the beam failure instance indication to the medium access control layer, indication information to the physical layer through the medium access control layer, wherein the indication information is configured to indicate the physical layer that the electronic device is currently performing the random access, or indicate the physical layer to stop sending the beam failure instance indication to the medium access control layer.

16. The electronic device of claim 10, wherein the steps of the method further comprise:
setting the count value of the beam failure indication counter to be zero after the new random access is triggered.

17. The electronic device of claim 10, wherein the electronic device is configured to:
keep performing the currently random access without triggering the new random access when a random access is currently being performed, thereby ensuring that the new random access is triggered only when the medium access control layer receives the beam failure instance indication sent by the physical layer and the count value of the beam failure indication counter is greater than or equal to the preset value, and the electronic device is currently not performing the random access;
avoid a random access being triggered again during the current random access, and prevent the beam failure recovery timer, which is performing timing due to the current random access, from being reset and restarting a timing before expiring; and select resources for a contention free random access (CFRA) to initiate a contention based random access (CBRA) after a period of time after selecting resources for the CFRA to initiate the CFRA, thereby avoiding long-term occupation of resources for the CFRA.

* * * * *